United States Patent
Toomey (10) Patent No.: US 10,346,044 B2
(45) Date of Patent: Jul. 9, 2019

(54) PRELOADING OF DIRECTORY DATA IN DATA STORAGE DEVICES

(71) Applicant: Western Digital Technologies, Inc., Irvine, CA (US)

(72) Inventor: Richard J. Toomey, Bonsall, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 114 days.

(21) Appl. No.: 15/098,853

(22) Filed: Apr. 14, 2016

(65) Prior Publication Data

US 2017/0300234 A1    Oct. 19, 2017

(51) Int. Cl.
    *G06F 1/32*       (2019.01)
    *G06F 3/06*       (2006.01)
    *G06F 12/0813*    (2016.01)
    *H04L 29/08*      (2006.01)
    *G06F 1/3203*     (2019.01)

(52) U.S. Cl.
    CPC ............ *G06F 3/0608* (2013.01); *G06F 3/067* (2013.01); *G06F 3/0611* (2013.01); *G06F 3/0625* (2013.01); *G06F 3/0634* (2013.01); *G06F 3/0659* (2013.01); *G06F 3/0685* (2013.01); *G06F 12/0813* (2013.01); *H04L 67/1097* (2013.01); *H04L 67/2842* (2013.01); *G06F 1/3203* (2013.01); *G06F 2212/1028* (2013.01); *G06F 2212/60* (2013.01); *Y02D 10/154* (2018.01)

(58) Field of Classification Search
    CPC ....................................................... G06F 3/0608
    USPC ........................................................ 713/320
    See application file for complete search history.

(56) References Cited

U.S. PATENT DOCUMENTS

| 5,915,122 | A | * | 6/1999 | Tsurumi | G06F 1/184 711/101 |
| 6,263,367 | B1 | | 7/2001 | Chu et al. | |
| 6,463,509 | B1 | * | 10/2002 | Teoman | G06F 9/4401 711/113 |
| 7,363,429 | B2 | | 4/2008 | Wu et al. | |
| 8,812,899 | B1 | * | 8/2014 | Fultz | G06F 12/0886 714/6.1 |
| 9,442,850 | B1 | * | 9/2016 | Rangarajan | H04L 67/2847 |
| 2006/0279869 | A1 | * | 12/2006 | Yamamoto | G06F 1/206 360/69 |
| 2007/0067560 | A1 | * | 3/2007 | Anzai | G06F 3/0611 711/112 |

(Continued)

FOREIGN PATENT DOCUMENTS

EP    1770494 A1    4/2007

OTHER PUBLICATIONS

International Search Report and Written Opinion for PCT/US2017/019977 dated Jun. 22, 2017.

*Primary Examiner* — Volvick Derose
(74) *Attorney, Agent, or Firm* — Chang & Hale LLP (57) ABSTRACT

Systems and methods are disclosed for providing directory data access in a data storage system. A network-attached storage device (NAS) includes a host interface for communicating with a host, an interface for communicating with a data storage drive associated with the NAS, a cache memory, and a controller configured to enter a power-saving mode by requesting directory data from the data storage drive, storing the directory data in the cache memory, and after requesting the directory data, sending a standby command to the data storage drive.

14 Claims, 3 Drawing Sheets

(56) References Cited

U.S. PATENT DOCUMENTS

| | | | |
|---|---|---|---|
| 2007/0125837 A1* | 6/2007 | Park | H04M 1/7253 235/375 |
| 2008/0183774 A1* | 7/2008 | Otani | H04L 67/1097 |
| 2009/0055399 A1* | 2/2009 | Lu | G06F 17/30132 |
| 2009/0112894 A1* | 4/2009 | Idei | G11B 19/02 |
| 2009/0217067 A1* | 8/2009 | Radhakrishnan | G06F 3/0625 713/320 |
| 2009/0300081 A1* | 12/2009 | Ueoka | G06F 17/30079 |
| 2009/0313427 A1* | 12/2009 | Ukai | G06F 1/3221 711/114 |
| 2010/0082729 A1* | 4/2010 | Shitomi | G06F 1/3203 709/202 |
| 2010/0174934 A1* | 7/2010 | Zhao | G06F 1/3203 713/324 |
| 2010/0287397 A1* | 11/2010 | Naor | G06F 1/3203 713/324 |
| 2010/0313044 A1* | 12/2010 | Rajpal | G06F 1/3203 713/320 |
| 2011/0040568 A1* | 2/2011 | Dutton | G06F 1/3221 705/1.1 |
| 2011/0271049 A1* | 11/2011 | Zimoto | G06F 1/3203 711/114 |
| 2011/0289331 A1 | 11/2011 | Kobayashi et al. | |
| 2012/0011313 A1* | 1/2012 | Kopylovitz | G06F 12/0866 711/113 |
| 2012/0296949 A1* | 11/2012 | Goto | G06F 17/302 707/831 |
| 2014/0082129 A1* | 3/2014 | Beard | H04L 67/1097 709/216 |
| 2014/0082288 A1* | 3/2014 | Beard | G06F 17/30132 711/123 |
| 2014/0181558 A1* | 6/2014 | Taha | G06F 1/3206 713/323 |
| 2015/0195322 A1* | 7/2015 | Shan | H04L 12/12 709/219 |
| 2016/0006829 A1* | 1/2016 | Ishii | G06F 3/0605 709/219 |

* cited by examiner

PRELOADING OF DIRECTORY DATA IN DATA STORAGE DEVICES

BACKGROUND

Field

This disclosure relates to data storage systems. More particularly, the disclosure relates to systems and methods for preloading directory data in data storage systems.

Description of Related Art

Clients may rely on directory data provided by a data storage device, such as a disk drive, when accessing data stored in the data storage device. Access to such directory data may be delayed while the disk drive is spun-up if the directory data is maintained only in disk media.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Figure 1:
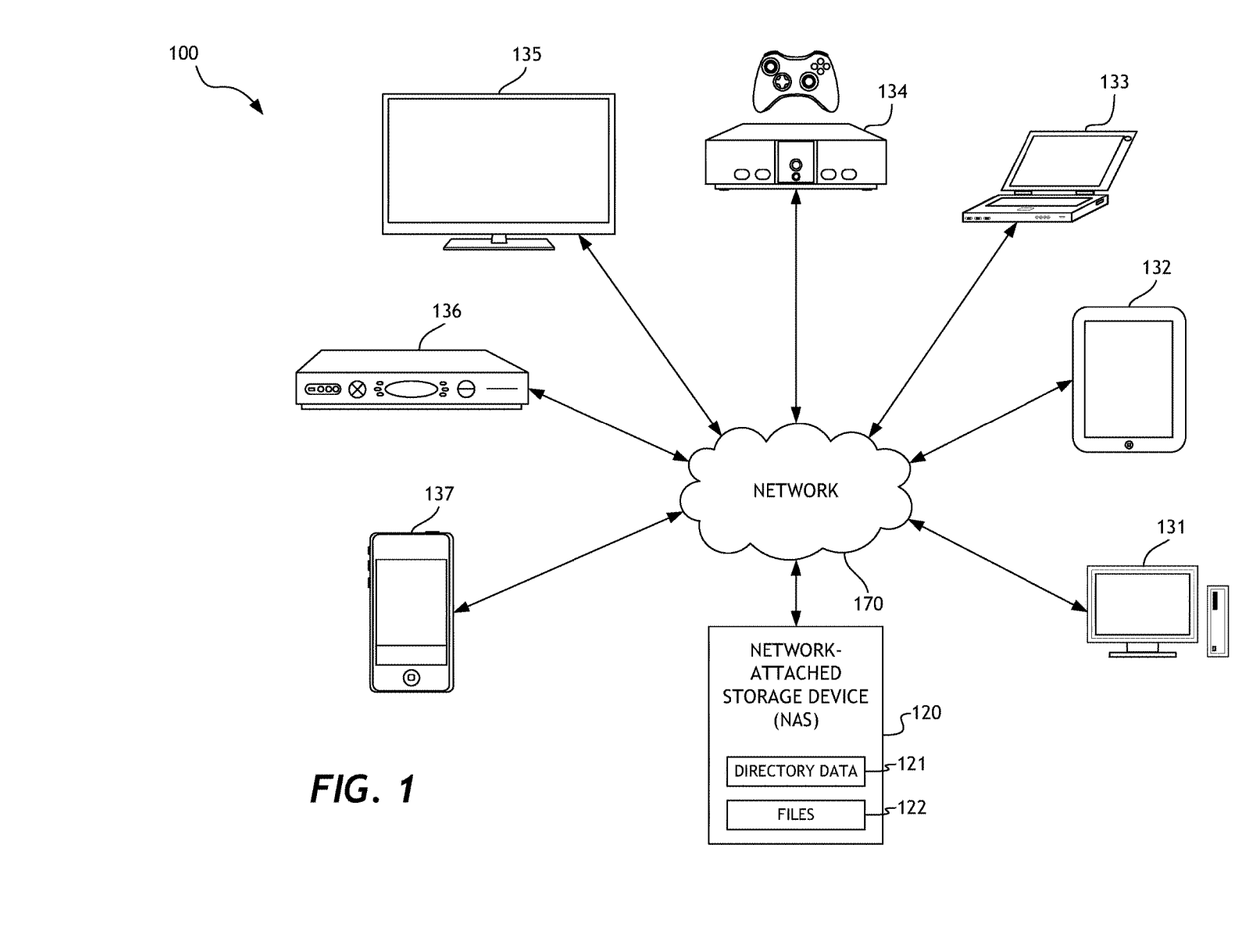
FIG. 1 is a diagram of a networked data storage system according to one or more embodiments.

Network-attached storage (NAS) drives/systems can provide file-level data storage over a computer network, wherein access to the stored data is accessible to one or more local and/or remote clients. A NAS may include hardware, software, or a combination of such elements, configured such that the NAS operates as a file server for the client(s). NAS devices/systems can provide a convenient mechanism for remotely accessing user data. FIG. 1 is a diagram illustrating an embodiment of a NAS system 100, in which a network-attached storage device (NAS) 120 is communicatively coupled to one or more client devices over a network 170 in order to provide data storage services to the devices over the network 170. Types of client devices that may have access to the NAS 120 can include, but are not limited to, phones 137, such as smartphones, cable set-top boxes 136, smart TV's 135, video game consoles 134, laptop computers 133, tablet computers 132, desktop computers 131, wearable computers, and/or other network-connected computing devices. The network 170 may be a local area network (LAN), a wide area network (WAN) (e.g., the Internet), or other type of computer network.

In certain embodiments, the NAS 120 may comprise disk media configured to store user files and/or other data. For example, the NAS 120 may comprise one or more disk drives, wherein the NAS 120 is configured to serve data stored on the one or more disk drives to connected clients. Although certain embodiments are disclosed herein in the context of magnetic disk media, it should be understood that principles disclosed herein may be applicable to optical disk memory, or other type of disk memory or memory that may be required to be spun-up or otherwise readied to allow for data to be read therefrom. While certain embodiments are described herein in the context of NAS devices/systems, it should be understood that references herein to NAS's may also apply to other types of data storage devices/systems, such as any type of computer device implementing software allowing for access to disk drive data storage that requires spin-up prior to provision of data therefrom.

In certain embodiments, the NAS 120 provides only file-based services. Alternatively, the NAS 120 may be configured to run software to provide additional server functionality. In certain embodiments, the NAS 120 may be configurable over the network 170 by a client device interface, such as a web browser of a mobile or desktop computing device. For example, a low-level operating system may be implemented in the NAS, such as FreeNAS or other open source NAS solution. In certain embodiments, the NAS 120 implements a Linux operating system, or the like. The NAS 120 may provide access to files using one or more network file-sharing protocols, such as Network File System (NFS), Server Message Block (SMB/CIFS), AFP, or the like.

In certain embodiments, when accessing file(s) stored on the NAS 120, a client/host device may first receive file directory data 121 from the NAS. The file directory data 121 may include, for example, a file allocation table (FAT), or the like. For example, the NAS 120 may implement an operating system (e.g., Linux) that maintains a file system defined by system data (e.g., directory data) identifying files, folders, or other information or metadata associated with the file system. The directory data 121 maintained by the NAS 120 may be based on the particular file system implemented by the NAS 120. Any suitable or desirable file system may be used in accordance with the present disclosure. The terms "directory data" and "directory information" are used herein according to their broad and ordinary meaning and may relate to any system data or metadata associated with a file system or architecture, or with files themselves. Directory data may identify file directories, or folders, which may allow a user to group files into separate collections. Directory data may include data associating filenames with indexes in a table of contents (e.g., an inode in a Unix-type file system). The file hierarchy associated with the directory data may be any type of hierarchy, such as a flat (i.e., linear) architecture, or a hierarchy defining directories and subdirectories. The directory data may comprise the metadata associated with the files maintained by the NAS 120, such as file names, file content lengths, file locations in the directory hierarchy, or the like, and may be stored separately from the files that the directory data is associated with, physically and/or logically.

When a client requests data storage access from the NAS 120, the NAS 120 may first provide the directory data 121 to the client to allow the client to view the file system of the NAS 120. If the directory data 121 is stored in data storage that is not currently in a state in which data stored thereon can be immediately accessed, there may be a delay in servicing the storage access request by the NAS 120, which may be undesirable from the client perspective. For example, where the NAS 120 comprises disk media, at a given moment or period of time, the disk media may not be spun-up, such as when the disk media is in a powered-down state. Spin-up of a disk or disk drive may refer to the process of a disk drive accelerating its platter(s)/disk(s) from a stopped state to an operational speed. The period of time taken by the drive to perform this process may be referred to as the spin-up time, and may result in data access delay, as described herein. The required operational speed may depend on the design of the disk drive. Example operational speeds for disk media may be 2400, 3600, 4200, 5400, 7200, 10000, or 15000 revolutions per minute (RPM), or some other speed. Achieving and maintaining operational speed for the disk(s) may require a significant portion of the available power budget of the NAS 120, and so application of power to the disks may be carefully controlled. For example, disk(s) may be spun-down in order to save power according to a power-saving mode of operation. The NAS 120 may further be configured to stop disk spinning in order to reduce noise and/or vibration.

Certain embodiments disclosed herein provide for reducing delay in servicing storage access requests in data storage devices, such as NAS devices, by caching directory data in non-disk media prior to spinning-down a disk drive. By providing the directory data from the cache, rather than requiring disk spin-up before directory data can be provided, systems, devices, and methods disclosed herein may enhance the user experience in locating/browsing files after the disk media has been placed in a power-save mode.

Directory Data Maintenance

Figure 2:
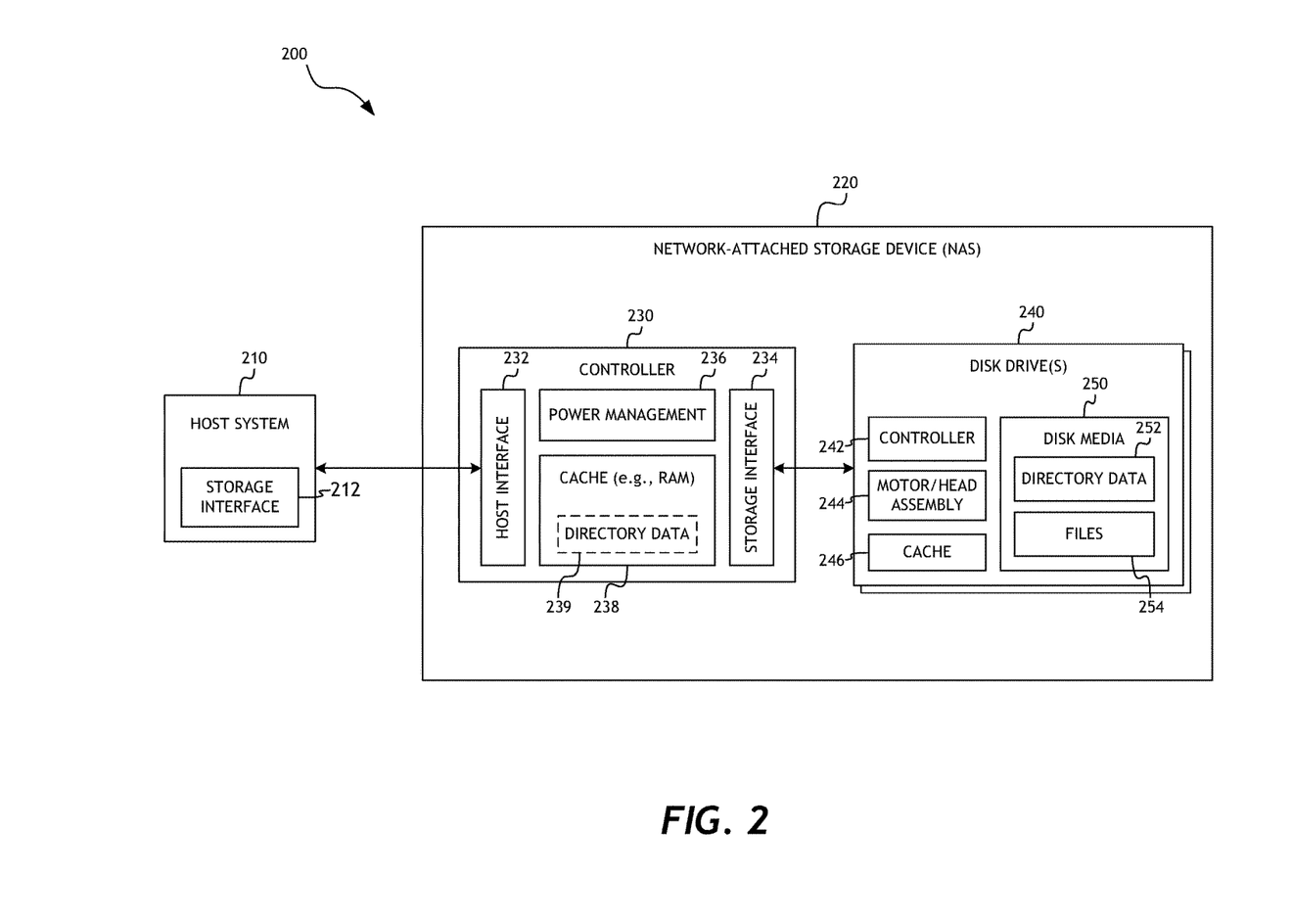
FIG. 2 is a diagram of a data storage system according to one or more embodiments.

FIG. 2 is a block diagram illustrating a network-attached storage device (NAS) 220 according to an example embodiment. The NAS 220 may be considered a NAS server device in some embodiments. The NAS 220 may be configured to provide directory data to a host (i.e., client) 210 without the need to first spin-up disk media 250 associated with the NAS 220. The terms "host" and "client" are used herein according to their broad and ordinary meanings, and may be used substantially interchangeably in certain contexts as presented herein. Although the device 220 is illustrated and described as a NAS device in the present disclosure, it should be understood that the device 220 may not be network-accessible, and may be any type of data storage device.

Referring to FIG. 2, the NAS device 220 may include a controller 230 and one or more disk drives 240, which may be mounted in an enclosure of the NAS 220 or otherwise communicatively coupled to the NAS 220 and/or controller 230. Each of the disk drive(s) 240 may include non-volatile magnetic disk media 250. In certain embodiments, the NAS 220 may be, for example, a hybrid hard drive including both magnetic media and solid-state media. The disk media 250 may comprise one or more disks that have been coated with a magnetic film. The film may be configured to have data written thereon by sending electrical pulses to a magnetic read/write head that is part of a head assembly 244.

The controller 230 may provide overall control for the NAS 220. The controller 230 may receive data and storage access commands from a storage interface 212 (e.g., a device driver) of the host system 210. In certain embodiments, the storage interface 212 utilizes a Domain Name Server (DNS) server in communicating with the NAS 220. The NAS may be callable through a web address Uniform Resource Locator (URL). Storage access commands communicated by the storage interface 212 may include write and read commands issued by the host system 210. The storage access commands may specify a Logical Block Address (LBA), or range of LBAs, in the NAS 220, and the controller 230 may execute the received storage access commands in the disk drive(s) 240.

The NAS 220 may be configured to implement data redundancy. For example, the controller 230 may implement redundant array of independent disks (RAID) technology, wherein the disk drive(s) 240 include a plurality of drives, disks, or other data storage partitions combined into a logical unit for the purposes of data redundancy and performance improvement. In addition, or alternatively, the controller 230 may be configured to implement RAID using one or more internal memory modules in combination with one or more external memory devices in certain embodiments.

The connection between the host system 210 and the NAS 220 may be wired, such as through Ethernet, USB, or other connection, or may be wireless, such as through WiFi, Bluetooth, or other wireless connection. In certain embodiments, the connection between the host system 210 and the NAS 220 is achieved over the Internet, wherein each of the host system 210 and the NAS 220 is connected to the Internet over a wired or wireless connection. The host 210 may be configured to access the NAS 220 substantially without network mapping. The host 210 may access the NAS 220 using any suitable communication protocol, such as CIFS, AFP, or the like.

The NAS 220 may store data received from the host system 210, such that the NAS 220 acts as data storage for the host system 210. To facilitate this memory function, the controller 230 may implement a logical interface. The logical interface may present to the host system 210 the data storage of the NAS 220 as a set of logical addresses (e.g., contiguous addresses) where data can be stored. The controller 230 may map logical addresses to various physical memory addresses in the disk drive(s) 240 and/or other memory module(s).

The one or more disk drives 240 may comprise spindle motor and head assembly hardware 244, including one or more read/write heads actuated radially over the respective disk(s), and a spindle motor for rotating the disk(s). The spindle motor may be used to spin-up the disk(s) to operational speed, as described above. Alternatively to, or in addition to, the disk media 250, the one or more disk drives 240 may include solid-state memory and/or other non-volatile memory. The one or more disk drives 240 may further include a cache memory module 246, which may be separate from the disk media 250, or integrated therewith. The one or more disk drives 240 may further include a controller 242, which may comprise one or more processors and/or hardware logic for executing operations in the disk media.

The controller 230 may include one or more processors configured execute an operating system, such as a Linux operating system. The controller 230 may implement a file system that is file-based, whereas the disk drive(s) 240 may be configured to execute storage commands on a block-level, or other data abstraction level.

The controller 230 may communicate with the disk drive(s) 240 over, for example, a Serial AT Attachment (SATA) connection. In certain embodiments, the controller 230 includes power management functionality 236, which may be designed to manage entering and exiting power-saving modes by the disk drive(s) 240. For example, the power management module 236 may be configured to initiate a sleep mode, or the like, by sending one or more commands to the disk drive(s) 240 over the communication channel therebetween. In certain embodiments, power-saving mode is triggered by a period of relative inactivity by the disk drive(s) 240. For example, the power management module 236 may monitor an idle time associated with the disk drive(s) 240, wherein after the amount of idle time reaches a certain threshold, power-saving mode is initiated.

When the disk drive(s) 240 are in a powered-down state, the drive(s) may be woken from the powered-down state in response to a data storage access request received from the host system 210. For example, the host 210 may send a command across a network connection to discover the NAS 220. When seeking data storage access in the NAS 220, the host 210 may initially request the directory structure. If the directory data 252 is maintained only on the disk media 250, the motor 244 may first have to spin-up the disk media 250 in order to retrieve the directory data 252 for the host 210.

When the host 210 connects to the NAS 220, browsing the shared directory for files can be delayed if the drive(s) 240 are in power-saving mode (e.g., spun-down), requiring a disk spin-up. In some implementations, the present disclosure relates to systems, methods and devices for reducing or eliminating such delay by speeding up the provision of the directory data (252, 239), thereby providing the user with a faster response. As described above, the directory data (252, 239) may comprise metadata that identifies directory locations of user files. The directory data may be a relatively small amount of data compared to the files 254 themselves. The directory data may identify the relevant file system hierarchy/structure.

The controller 230 may include or be coupled to a cache memory module 238, which may comprise solid-state random access memory (RAM) or NAND flash memory (i.e., flash memory based on logical NAND-type gate structures). Generally, the data path between the NAS and the host system 210 may include the cache 238. Therefore, in providing data to the host system 210, the controller may provide such data from the disk drive(s) or the cache 238. Certain embodiments disclosed herein provide for provision by the controller 230 of the directory data 239 from the cache 238 rather than from the disk media 250 when initially responding to a host request. In order to allow for such provision of the directory data 239 from the cache 238, certain embodiments provide for storing the directory data 239 in the cache 238 as a matter of course in connection with initiating spin-down of the disk drive(s) 240.

In certain embodiments, the controller is configured to provide one or more commands to the disk drive(s) 240 prior to entering power-saving mode; that is, prior to sending a standby command (e.g., immediately before sending such command), the controller may transmit one or more commands to the disk drive(s) 240 to retrieve the directory data 252 from the disk media 250 for the purpose of storing directory data in the cache 238. The standby command may cause the disk drive(s) 240 to enter power-saving mode. Power-saving mode may provide power-savings by spinning down the drive, for example after a preset idle time.

With the directory data 239 stored in the cache 238, the controller 230 may be able to provide the directory data 239 to the host 210 irrespective of the operational state of the disk drive(s) 240, which may prevent undesirable delay in servicing storage access requests to the host system 210. The host 210 may browse the directory data 239 during the time that the disk media 250 is being spun-up. If browsing of the directory data 239 by the host 210 takes at least as long as the amount of time required to spin-up the disk media 250, substantially no delay may be experienced by the host 210 in accessing the files 254 stored on the disk media 250.

Data Access Processes

Figure 3:
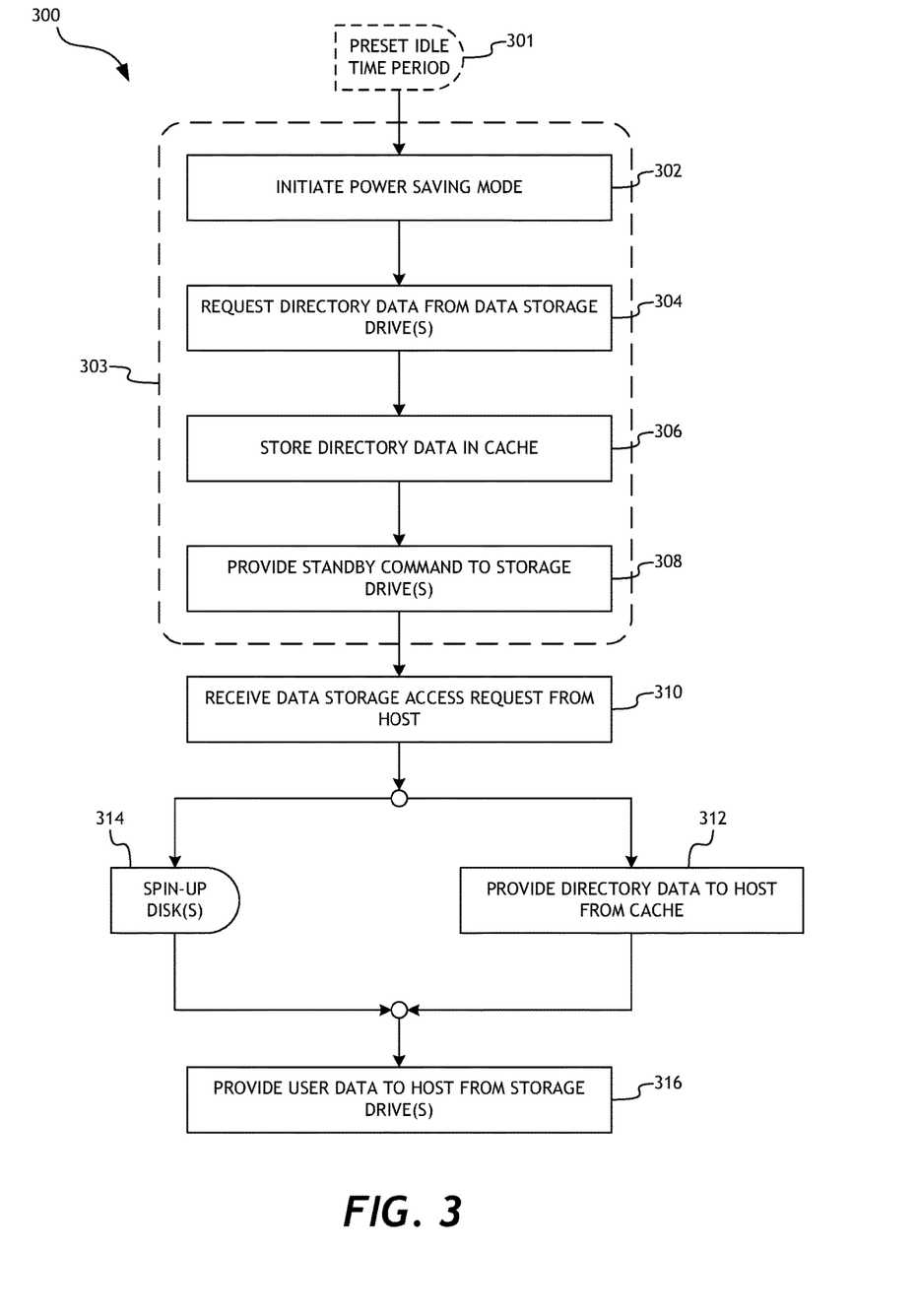
FIG. 3 is a flow diagram illustrating a process for managing directory data according to one or more embodiments.

As described above, a NAS or other data storage device may save power by entering a power-saving, or sleep, mode, wherein disk media may be spun-down to achieve power-savings. In some implementations, when a host/client attempts to access the data storage device, a delay may be experienced due to the necessity of spinning-up the storage media. Such delay may be 10 seconds or less, or may be as long as 30-60 seconds. FIG. 3 is a flow diagram illustrating a process 300 for providing directory information substantially without delay according to one or more embodiments disclosed herein. The process 300 involves a data storage device, such as a magnetic disk drive, entering a power-saving mode at block 302, wherein power-saving mode involves spinning-down disk media. In some implementations, disk spin-down is designed to occur after a timer expires. A standby command may be sent to the data storage drive to direct the drive to enter power-saving mode.

Generally, after a standby command is sent by a NAS controller to a disk drive associated therewith, the NAS memory (e.g., RAM) may contain the last user data accessed, and may not contain the directory data for the file system of the NAS. The disk driver can use the memory first before going to disk to respond to I/O requests. Embodiments disclosed herein provide reduced data access delays by taking advantage of the availability of data contained in the NAS memory when disk memory is not at operational speed. In some implementation, as demonstrated in FIG. 3, principles disclosed herein provide for the execution of a directory refresh before sending the standby command to the disk drive in order to pre-load the NAS memory (e.g., RAM) with the directory data, which is commonly accessed by a client when coming out of power-saving mode. Such a configuration allows the NAS device to respond with the directory data from the cache memory while the disk media is spinning-up for user access.

With reference to FIG. 3, the power-saving mode may be triggered at least in part by the lapsing of a predefined, or preset, idle time period, which is illustrated in the diagram of FIG. 3 at block 301. Although the block 301 is illustrated as corresponding to the lapsing of a preset idle time period, it should be understood that initiation of power-saving mode, as shown at block 302, or other condition in which a disk drive may be placed in a spun-down state, may or may not be preceded by the lapsing of a time period or other idle time evaluation.

At block 304, the process 300 involves, such as in connection with initiation or entry of a power-saving mode or other disk spin-down process, requesting directory data from the disk drive(s) entering the power-saving mode or spin-down state. The step of block 304 may involve sending a directory refresh command to the data storage drive.

At block 306, the process 300 involves storing the directory data in a memory module separate from the disk media, such as a cache memory (e.g., main memory of a NAS device). The directory data requested from the data storage drives may be maintained during disk power-down in the cache memory, or other memory module, such as a solid-state memory module or array. In certain embodiments, the directory data is cached in a random access memory (RAM) device, as described above. As described above, the maintenance of the directory data in a solid-state memory module or other cache or memory device or module may allow for access to the directory data irrespective of whether the disk memory is currently spinning or is in a powered-down or standby state. In certain embodiments, the directory data does not include mapping data, which may be managed by the client.

At block 308, the process 300 involves providing a standby command to the one or more disk drives. The standby command, described above, may direct the storage drives to spin-down and/or execute one or more other power saving operations.

In the diagram of FIG. 3, the collective blocks 303 may comprise a sub-process for entering a power-saving or standby mode for one or more disk drives associated with a data storage device. For example, in the standby or power-saving mode, the data storage device may comprise one or more disk drives that are maintained in a spun-down state in such mode. Although the blocks 302-308 are illustrated in a certain order, it should be understood that the power-saving or standby mode sub-process 303 may be performed in any desirable or practical order. Furthermore, one or more steps of the sub-process 303 may be omitted in certain embodiments, and/or one or more additional steps not illustrated in FIG. 3 may be included in the sub-process 303. According to the sub-process 303, before entry into power-saving mode is complete (e.g., the last operations before entry into power-saving mode), the directory data is checked and loaded into the cache (e.g., RAM). In certain embodiments, power is still supplied to the cache during power-saving mode, and therefore, the cache may be a volatile memory.

The refresh directory command (described above with respect to block 304) and/or standby command (described above with respect to block 308) may be standard commands according to certain data storage protocols (e.g., SATA protocol). In addition to the refresh directory and standby commands, the sub-process 303 may include one or more additional commands, such as a cache flush command, or other command associated with entering a power-saving mode. For example, with reference to FIG. 2, a cache flush command may involve flushing at least some of the contents of the cache 238 to the disk media 250 or other media associated with the disk drive(s) 240.

In certain embodiments, in addition to the pre-loading of directory data in the cache, one or more files or other pieces of data may also be pre-loaded based on assumptions about what is likely to be requested by the client initially upon waking the disk drive(s) from sleep mode.

After completion of the sub-process 303, the one or more data storage drives, such as disk drives, may be in a standby state, wherein the disk drives are at least partially spun-down.

At block 310, while in the standby state, the process 300 involves receiving a data storage access request from a host or client device or system requesting access to data stored in the disk drives. For example, the host or client may make a request to view the file system associated with the data storage drives and/or one or more files stored thereon.

Receipt of the data storage access request may trigger a wake-up process for the storage drive(s). The host may wish to initially view the directory structure defining the contents of the storage drive(s). As described above, in some implementations, the directory data may be stored in the spun-down storage drive(s), requiring spin-up of the same before providing access to the data. Conversely, at block 312, the process 300 involves providing the directory data from the cache memory to the host or client device or system, not the storage drive(s). That is, because the directory data is maintained in the cache, the process 300 allows for provision thereof directly from the cache without requiring spin-up of the disk drive(s) prior thereto. For example, as shown in the diagram of FIG. 3, the process 300 may allow for the directory data to be provided to the client or host prior to, or at least partially simultaneously with, spin-up of the disk drives, which is represented at block 314. Therefore, the potential delay described above associated with spinning-up disk drives for the purpose of servicing data access requests may be alleviated and/or prevented by allowing substantially instantaneous access to the directory data. For example, the host may interact with the directory data for a time period equal to or greater than the amount of time required to spin-up the disk drive(s), thereby effectively eliminating any delay associated with disk drive spin-up. This reduction in delay can advantageously increase user satisfaction.

In implementations not providing directory data maintenance in cache memory, a delay of 10 seconds or more (e.g., 13 seconds) may be experienced, whereas the process of FIG. 3 may result in less than one second of delay. At block 316, the process 300 involves providing user data to the host from the spun-up disk drives after having provided the directory data to the host directly or indirectly from the cache memory. Although embodiments are disclosed herein in the context of disk drives, the principles disclosed herein may be applicable in systems storing user files on solid-state devices, such as NAND flash. The process 300 may be performed at least in part by a controller of a NAS device, such as by the controller 230 of the network-attached storage device 220 shown in FIG. 2 and described above.

Additional Embodiments

Those skilled in the art will appreciate that in some embodiments, other types of directory data access systems, devices and methods can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, Application-Specific Integrated Circuit (ASIC), Field-Programmable Gate Array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A network-attached storage device (NAS) comprising:
   a host interface for communicating with a host that is separate from the NAS;
   a storage interface for communicating with a data storage drive associated with the NAS, the data storage drive comprising disk storage and a disk drive controller;
   a solid-state cache memory separate from the data storage drive; and
   a controller separate from the data storage drive and configured to:
      determine that a preset idle time has elapsed;
      in response to the determination that the preset idle time has elapsed, cause the data storage drive to enter a power-saving mode at least in part by:
         requesting directory data stored in the disk storage from the data storage drive, the directory data comprising a file directory structure including at least directories, subdirectories, file names, and file locations in the file directory structure for all files stored on the data storage drive;
         receiving the directory data from the data storage drive;
         storing the directory data in the solid-state cache memory of the NAS; and
         after receiving the directory data, sending a standby command to the data storage drive; and
      in response to receiving a request from the host to access the data storage drive while in the power-saving mode, exiting the power-saving mode at least in part by:
         sending a spin-up signal to the data storage drive; and
         prior to the data storage drive finishing spinning-up and without accessing the data storage drive, providing the directory data to the host from the solid-state cache memory of the NAS, wherein the host is configured to display the file directory structure for the data storage drive.

2. The NAS of claim 1, wherein:
   the controller is further configured to execute a cache flush command prior to sending the standby command to the data storage drive responsive to entering the power-saving mode; and
   said executing the cache flush command causes contents of the solid-state cache memory of the NAS to be stored in the data storage drive.

3. The NAS of claim 1, wherein said providing the directory data to the host is performed within one second of said receiving the request from the host to access the data storage drive.

4. The NAS of claim 1, wherein said storing the directory data in the solid-state cache memory allows for browsing of the directory data by the host without waiting for the data storage drive to spin-up.

5. The NAS of claim 1, wherein the controller is further configured to provide user data from the data storage drive to the host after the data storage drive has finished spinning-up.

6. The NAS of claim 1, wherein said requesting the directory data comprises sending a directory refresh command to the data storage drive.

7. A method of managing data in a network-attached storage device (NAS), the method comprising:
   placing a data storage drive associated with a NAS in a power-saving mode at least in part by:
      determining that a preset idle time has elapsed; and
      in response to the determination that the preset idle time has elapsed:
         requesting, from the data storage drive, directory data comprising a file directory structure including at least directories, subdirectories, file names, and file locations in the file directory structure for all files stored on the data storage drive, the data storage drive comprising disk storage that stores the directory data;
         receiving the directory data from the data storage drive;
         storing the directory data in a solid-state cache memory of the NAS, the solid-state cache memory being separate from the data storage drive; and
         after storing the directory data in the solid-state cache memory, sending a standby command to the data storage drive; and
   in response to receiving a request from a host to access the data storage drive while in the power-saving mode, bringing the data storage drive out of the power-saving mode at least in part by:
      sending a spin-up signal to the data storage drive; and
      prior to the data storage drive finishing spinning-up and without accessing the data storage drive, providing the directory data to the host from the solid-state cache memory of the NAS, wherein the host is configured to display the file directory structure for the data storage drive.

8. The method of claim 7, further comprising executing a cache flush command prior to sending the standby command to the data storage drive, wherein said executing the cache flush command includes storing contents of the solid-state cache memory in the data storage drive.

9. The method of claim 7, wherein said providing the directory data to the host is performed within one second of said receiving the request from the host to access the data storage drive.

10. The method of claim 7, wherein said storing the directory data in the solid-state cache memory of the NAS allows for browsing of the directory data by the host without waiting for the data storage drive to spin-up.

11. The method of claim 7, further comprising providing user data from the data storage drive to the host after the data storage drive has finished spinning-up.

12. The method of claim 7, wherein said requesting the directory data comprises sending a directory refresh command to the data storage drive.

13. A network-attached storage device (NAS) comprising:
   a host interface means for communicating with a host that is separate from the NAS;
   a storage interface means for communicating with a data storage drive associated with the NAS, the data storage drive comprising disk storage and a disk drive controller;
   a solid-state caching means separate from the data storage drive; and
   a processing means separate from the data storage drive and configured to:
      determine that a preset idle time has elapsed;
      in response to the determination that the preset idle time has elapsed, cause the data storage drive to enter a power-saving mode at least in part by:
         requesting directory data stored in the disk storage from the data storage drive, the directory data comprising a file directory structure including at least directories, subdirectories, file names, and file locations in the file directory structure for all files stored on the data storage drive;

receiving the directory data from the data storage drive;

storing the directory data in the solid-state caching means of the NAS; and after requesting the directory data, sending a standby command to the data storage drive; and in response to receiving a request from the host to access the data storage drive while in the power-saving mode, exiting the power-saving mode at least in part by:

sending a spin-up signal to the data storage drive; and prior to the data storage drive finishing spinning-up and without accessing the data storage drive, providing the directory data to the host from the solid-state caching means of the NAS, wherein the host is configured to display the file directory structure for the data storage drive.

14. The NAS of claim 13, wherein the processing means is further configured to:

prior to requesting the directory data:

send a directory refresh command to the data storage drive; and execute a cache flush command that causes contents of the solid-state caching means of the NAS to be stored in the data storage drive.

* * * * *